Jan. 23, 1962   R. E. MARBURY   3,018,427
POWER CAPACITOR UNITS
Filed Aug. 13, 1958   2 Sheets-Sheet 1

WITNESSES
John E. Heasley, Jr.
E. Herbert Liss

INVENTOR
Ralph E. Marbury
BY F. P. Lyle
ATTORNEY

Jan. 23, 1962 R. E. MARBURY 3,018,427
POWER CAPACITOR UNITS
Filed Aug. 13, 1958 2 Sheets-Sheet 2 ated Jan. 23, 1962

3,018,427
POWER CAPACITOR UNITS
Ralph E. Marbury, Bloomington, Ind., assignor to Westinghouse Electric Corporation, East Pittsburgh, Pa., a corporation of Pennsylvania
Filed Aug. 13, 1958, Ser. No. 754,812
7 Claims. (Cl. 317—242)

The present invention relates to power capacitors and, more particularly, to capacitor units with improved heat dissipation and voltage stress distribution, intended for use on high voltage transmission or distribution lines.

Capacitors, either singly or in banks, are often connected to transmission or distribution lines to improve the power factor or for other purposes. In recent years, insulation and dielectric materials have been improved so that it is possible to build capacitor units having a much larger kvar. rating than that which could be given to a capacitor of equal size with previously utilized types of materials. Capacitor units have previously been confined to ratings of 7½ to 25 kvar. The 25 kvar. unit was the largest unit that could be used in a commercially practicable sized case with desirable proportions of length to width. Since these units are often pole mounted the physical size and shape of a unit must be limited. Presently the physical size per kvar. has been so reduced that units of 50 kvar or 100 kvar. can be built. Building the units with larger kvar. ratings results in a considerable cost saving per kvar. In large banks where large kvar. ratings are required, it has been the practice to use many smaller units connected in series or series parallel groups. Increasing the kvar. rating of a unit results in a considerable reduction in the number of terminal bushings and connections required in a bank as well as savings in labor costs. Thus, manufacturing of larger rated units results in a considerable cost saving.

The kvar. rating which can be given to a power capacitor is, in part, limited by the temperature rise of the dielectric caused by losses in the unit. Therefore, the kvar. rating which can be given to it depends on the effectiveness of the cooling means in removing the heat to keep the temperature of the dielectric within safe limits.

The units having a larger kvar rating raise a serious problem in regard to heat dissipation, however. With a smaller unit housing there is less case surface for radiation of heat generated due to dielectric losses in the capacitor unit. More effective means are required for rapid transfer of the heat to the case surface for radiation. This is an even greater problem in capacitors with higher voltage rating.

One of the major problems in the design of a high voltage capacitor results from the voltage stress between the capacitor foils and the metal case. With these elements separated by insulation, the full voltage applied to the capacitor exists between the case and the foils and the voltage stress becomes concentrated at the foil edges. This concentrated voltage stress may become high enough to result in deterioration and eventual breakdown of the insulating material at these points causing failure of the capacitor. In a 14,400 volt capacitor, for example, heavy insulation is required between the case and the capacitor sections. The voltage between capacitor section and case would be 14,400 volts and unless very heavy insulation were used in the presently known construction, ionization due to concentration of stress would result. However, the heavy insulation introduces heat transfer difficulties which, as pointed out above, is a serious problem particularly in the higher kvar. ratings.

Commercially practicable capacitor units with higher kvar ratings require improved heat transfer means from the capacitor sections to the case. One approach utilized in the present invention is to provide a capacitor section with improved heat transfer characteristics. Another approach taken herein, which is particularly useful in higher voltage ratings, is to provide a capacitor section which is designed to reduce voltage stress between the section and the case thereby permitting less insulation between the capacitor sections and their cases which, in turn, results in improved heat transfer characteristics.

The principal object of the present invention is to provide an improved capacitor unit in which the heat generated by the losses in the unit is very effectively removed.

Another object of the invention is to provide an improved capacitor unit in which each section is so designed as to transfer a large portion of heat from the center of the section to the outer edge thereof whereby it can be more rapidly dissipated through the case insulation.

A further object of the invention is to provide an improved capacitor unit which utilizes a wrapping of foil about the capacitor sections to conduct heat generated in the interior portions of the sections to the case surface for radiation.

A still further object of the invention is to provide an improved capacitor unit which utilizes a wrapper of alternating layers of metallic foil and insulating material about the capacitor sections to grade the voltage stress downwardly between the capacitor sections and the case, which results in a reduction in the amout of case insulation required thereby providing for improved heat transfer to the case surface, and in which the metal foils of the wrapping aid in conducting heat from the interior portions of the section to the case surface.

Other objects and advantages of the invention will be apparent from the following detailed description, taken in connection with the accompanying drawings, in which.

Figure 1:
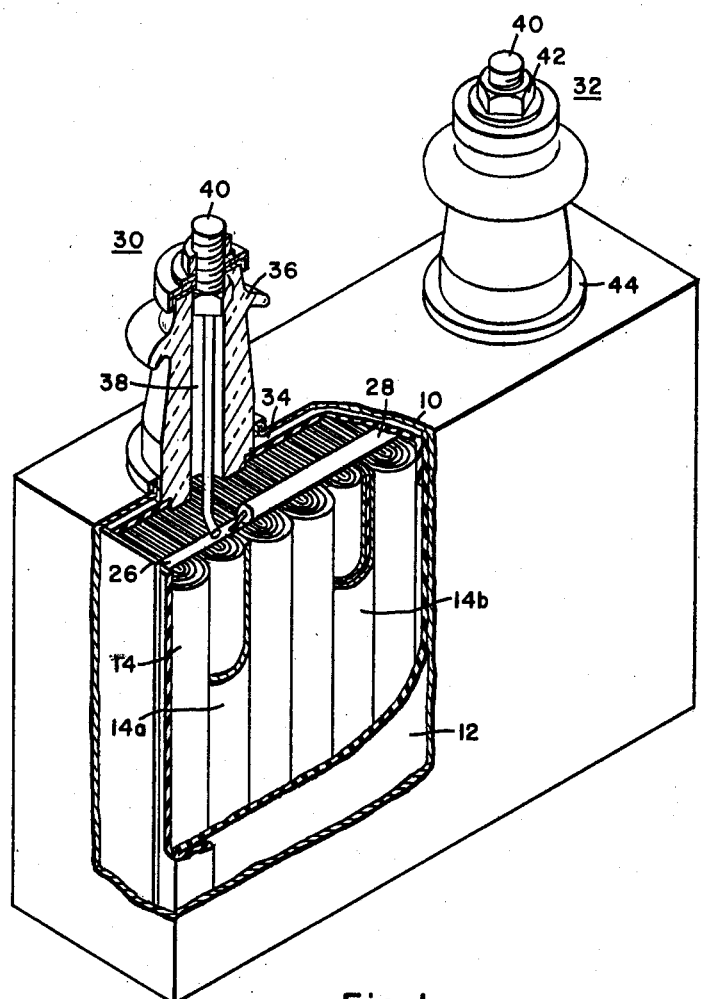
FIGURE 1 is a cutaway perspective view of a capacitor unit including capacitor sections illustrating two embodiments of this invention.

The capacitor unit in FIG. 1 comprises a sheet metal case 10 having an insulating liner 12 which may be made of pressboard, or other insulating material, and is fitted inside the case 10. The insulating liner 12 may be of any suitable insulating material and it may be of any suitable thickness depending primarily on the voltage rating of the capacitor unit. The capacitor sections 14 are placed inside the case within the insulating liner 12 and extend from side to side of the case 10.

Shown in cutaway view in FIG. 1 are capacitor sections representing two different embodiments of the invention. The capacitor section illustrated by 14a is illustrated in transverse cross section in FIG. 3. The capacitor section 14b is illustrated in transverse cross section in FIG. 4. It will be understood, of course, that usually either the type of section illustrated by 14a or the type of capacitor section illustrated by 14b will be used exclusively in any particular unit or capacitor bank. For convenience and simplification of the drawings an example of each has been shown in the same unit. The capacitor sections 14 each include a layer of metal foil 16 and a layer of metal foil 18. Between the layers of metal foil are placed dielectric sheet material, preferably paper. A layer 20 of dielectric material is placed between foils 16 and 18 and a layer 22 is placed on layer 18. The several layers are rolled together as a unit to form a cylindrical roll with flattened side faces connected by curved end walls. In winding a capacitor section two dielectrics 20 and 22 and two foils 16 and 18 are wound upon a mandrel with one dielectric between the foils and one on the outside of one foil so that a foil will always be adjacent to a dielectric on both sides.

Figure 3:
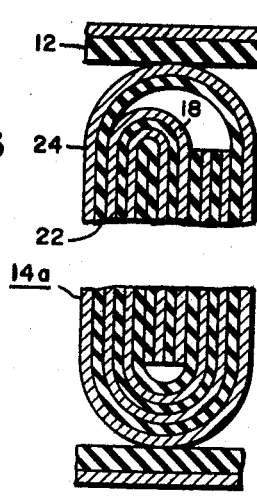
FIG. 3 is a transverse sectional view of one embodiments of the invention.

The FIG. 3 embodiment has wrapped around the capacitor section a layer of metal foil 24 which completely encircles the capacitor section 14a and is insulated from the capacitor foils 16 and 18. This wrapper 24 may be of any suitable material which is a good heat conductor, an example being aluminum. The wrapper 24 may consist of as many turns as is desired or necessary for proper conduction of heat and may be of any suitable or desirable thickness. The capacitor sections 14 are placed within the case 10 and insulation 12 as shown in FIG. 1 with their side faces adjacent each other. Each of the foils 16 and 18 have attached thereto along an exposed edge a tab 15 which serves as a terminal. A pair of bus bars 26, of which only one can be seen in FIG. 1, are attached to the tabs in such a manner as to connect the capacitor sections together to form a single unit of either series connected or series parallel connected capacitor units depending on the voltage and kvar. rating required.

A discharge resistor 28 is built into the capacitor unit and consists of resistors which may be ceramic resistors or any other suitable or desirable type connected in series. In FIG. 1 the resistor 28 is connected to the bus bar 26 and is in turn connected from one terminal of the capacitor to the other. This constitutes a discharge device which will discharge the capacitor after the capacitor is disconnected from a source of potential and it will prevent any harmful residual voltage from building up across the capacitor terminals.

A pair of terminals 30 and 32 are provided on the case and are received in openings 34 in the top of the case 10. The bodies 36 of the terminals may be of glazed porcelain or any other suitable or desirable material. The porcelain bodies have central openings 38 through which a lead wire is connected to a threaded terminal post 40. The lead is connected at its other end to one of the bus bars 26. A nut 42 is threaded on the terminal post 40 for securement to a suitable line. At the base of the porcelain body 36 of the terminals 30 is provided a base ring 44 which may be soldered to the porcelain body or secured in any suitable manner which will prevent entrance of foreign matter.

In a conventional capacitor section which does not include the outer heat conducting wrapper 24 the heat generated in the capacitor is concentrated at the hot spot which is substantially in the center of a transverse cross section of the section. The heat in a conventional design flows along the foils until the bend is reached adjacent the insulating liner 12. At this point the heat must flow through the dielectric layers 20 and 22 to the insulating liner 12. The temperature drop from the point of the bend to the insulation is often just as great as the temperature drop from the foil to the case 10 through the insulation 12. The foil wrapper 24 wound around the outside of the section can reduce the temperature drop from the center of the section to the outer edge by as much as 50% and in some cases more. In the unique design disclosed herein some heat flows straight along the foils as before but some now flows into the wrapper 24 and along the wrapper to the edge and surface of the insulating liner 12. This foil 24 may be of any suitable thickness. The selection of the thickness depends upon the heat due to the losses generated at the hot spot of the capacitor section.

Figure 2:
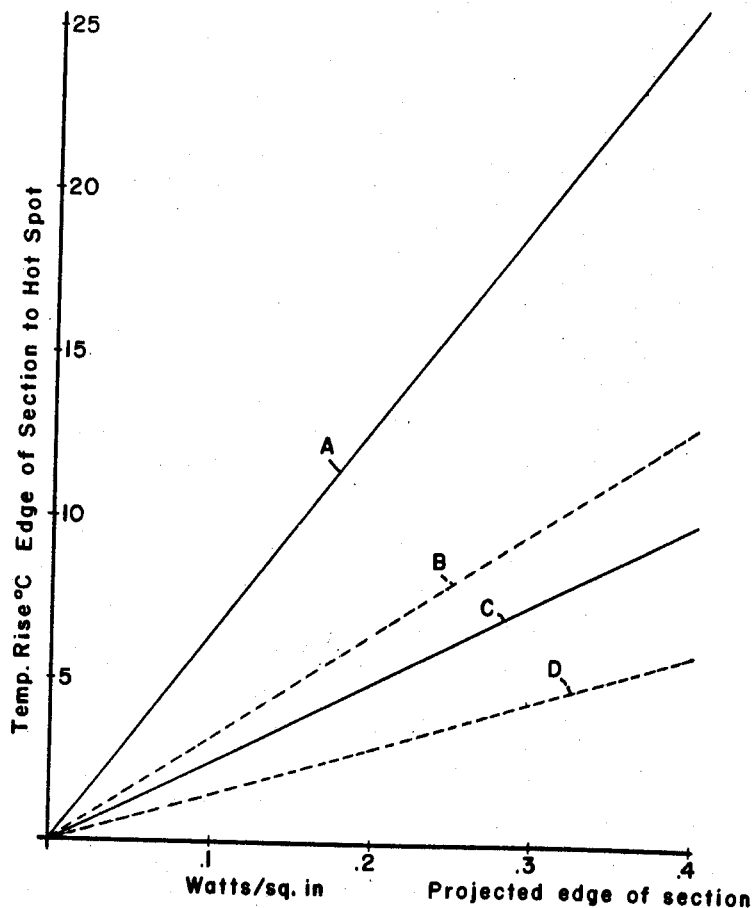
FIG. 2 is a curve illustrating the improvement in heat dissipation obtained by the embodiment of the invention illustrated in FIG. 3.

The curve, FIG. 2, illustrates the outstanding results obtained by this unique construction. Curves A and C represent sections without foil wrap while curves B and D represent the results of sections employing the new wrapper. Curves A and B represent a section 1.25 inches thick. The section represented by curve B has added 50 turns of double .00025 inch thick aluminum foil, while curve A has no wrapper therearound; curves C and D represent sections .70 inch thick, curve C being an unwrapped section while curve D has a wrapper which consists of 25 turns of double .00025 inch aluminum foil. All of the sections have the same insulation. The ordinate of the curves represents temperature rise in degrees centigrade from the edge of the section to the hot spot. The abscissa represents watts per square inch on a projected edge of a section. In the section represented by curves A and B, with a watt loading 0.3, the rise is reduced from 20° C. to 10° C. Corresponding reductions in temperature rise occur at all points on the various curves by employing the new foil wrapper.

Thus, it can be seen that a very effective increase in heat dissipation results from a simple but ingenious construction, namely that of employing a heat conducting wrapper about the capacitor section. This novel construction permits manufacture of capacitor units having ratings exceeding 50 and even 100 kvar. in a commercially practical unit of such size and proportions of length to width that it can be used in any desired power capacitor application.

The embodiment shown in FIG. 3 is suitable for capacitor ratings up to 7960 volts at 60 cycles. In these capacitors there is a rather close association of the capacitor section edge and the case for the transfer of heat to the case surface for radiation. When higher voltage capacitors are made, the case insulation must be thicker to prevent such concentration of stress as to induce ionization and consequently breakdown of the insulation. Even so, there is a chance of ionization due to concentration of stress. This stress concentration may be reduced by grading the voltage down. The FIG. 4 embodiment of this invention provides such a means for grading the voltage down, thereby reducing the need for an extra thick insulating liner 12. This improves the heat dissipation characteristics and at the same time it prevents breakdown of the insulation due to concentration of the voltage stress.

Figure 4:
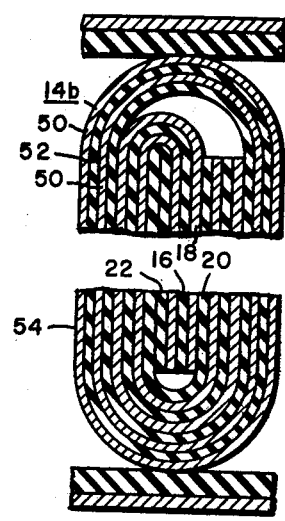
FIG. 4 is a transverse sectional view of another modification of the invention.

The main body of the capacitor section, FIG. 4, is identical with the main body of the capacitor section shown in FIG. 3. However, the section 14b differs in the type of wrapper used. It will be understood as pointed out hereinabove that although the FIG. 4 embodiment represented by section 14b in FIG. 1 is shown in the same case with the embodiment representing capacitor section 14a, only one or the other of these will be used in a single unit.

The wrapper around the capacitor section 14b consists of alternating layers of insulation 50 and conducting foil 52 which form a wrapper 54 about capacitor section 14b. After winding of the two foils 16 and 18 and the dielectrics 20 and 22 in the usual manner, several turns of paper or other suitable insulation are wrapped around the section and cut off. Then a complete turn of foil is wrapped around the paper 50; then another wrapper of paper and then another complete turn of foil and so on until a sufficient wrapper has been provided as is necessary to bring the voltage stress down to the case insulation in several steps following the well known grading practice and making the steps small enough to prevent ionization. It would appear for example that three steps which includes three layers of foil would be sufficient for a 14,400 volt capacitor. In this case it would be objectionable to use the same case insulation 12 as is used for a 7200 volt capacitor.

It will, of course, be apparent that the voltage stress between adjacent layers of foil 52 across each layer of insulation 50 would be approximately equal so that in a 14,400 volt capacitor each step would be stressed to approximately 4600 volts. It will be obvious, of course, that since the stress across the insulating liner 12 will be approximately 4600 volts an extra heavy insulating liner is not required.

The foil layers 52 in addition to serving as voltage grading devices will also serve to conduct heat to the insulating liner 12 as in the FIG. 3 embodiment. Thus, two distinct advantages with regard to heat dissipation are obtained by this construction. The voltage stress is graded down so that less case insulation is required providing better heat transfer to the case, and the foil itself is used to conduct some of the heat from the hot spot directly to the insulating liner.

The embodiments of the invention described herein are suitable for capacitor units having kvar. ratings in the order of 100 kvar. for voltages up to 14,400 volts and above. The FIG. 3 embodiment is preferable for voltages up to 7960 volts since less material is used. For voltages in the order of 14,400 volts and above, the FIG. 4 embodiment is preferable since it is capable of grading down the voltage between the capacitor foils and the case. It will, of course, be understood that the invention is capable of various modifications and embodiments. Thus, in some cases it may be desirable to provide an improved heat flow path for increasing the rate of heat dissipation from the hot spot of the capacitor to case surface where the heat may be radiated. In other cases it may be desirable to reduce the voltage stress between the capacitor foils and the metal case in order to permit use of thinner insulation to increase heat dissipation as well as to prevent breakdown of the insulation.

It will be seen, therefore, that a relatively simple but very effective construction has been provided for increasing the rate of heat dissipation as well as for reducing the voltage stress between the capacitor foils and the metal case. Certain specific embodiments of the invention have been shown and described for the purpose of illustration but it will be apparent that various other modifications and embodiments are possible and are within the scope of the invention.

I claim as my invention:

1. A capacitor unit comprising a rectangular case, an insulating liner in said case, a plurality of capacitor sections, each section comprising alternating layers of conducting foil and dielectric sheet material rolled together into a unitary, elongated cylindrical structure having flat side faces and end faces, said sections disposed in said case with their side faces adjacent each other and their end faces abutting said insulating liner, said sections being electrically connected together and each section having a plurality of alternate layers of conducting material and insulating material wrapped therearound.

2. A capacitor unit comprising a case, an insulating liner in said case, a plurality of capacitor sections each comprising alternating layers of conducting foil and dielectric sheet material wound together to form a roll, said sections disposed in said case, each of said sections having portions thereof abutting said insulating liner, said sections being electrically connected together and each section being individually surrounded by metal foil and insulated therefrom.

3. A capacitor unit comprising a rectangular case, an insulating liner in said case, a plurality of capacitor sections, each section comprising alternating layers of conducting foil and dielectric sheet material spirally rolled together into a unitary, elongated, cylindrical structure having flat side faces and end faces, each of said sections disposed in said case with their side faces adjacent each other and their end faces abutting said insulating liner, said sections being electrically connected together and each section having a layer of metal foil wrapped therearound insulated from said section.

4. A capacitor unit comprising a rectangular case, an insulating liner in said case, a plurality of capacitor sections, each section comprising alternating layers of conducting foil and dielectric sheet material rolled together into unitary, elongated, cylindrical structure having flat side faces and end faces, said sections disposed in said case with their side faces adjacent each other and their end faces abutting said insulating liner, said sections being electrically connected together and each section having a layer of heat conducting foil wrapped therearound and insulated from said section, whereby heat from the interior of each of said sections flows into its respective heat conducting foil and thence to the surface of said insulating liner.

5. A capacitor unit comprising a case, an insulating liner in said case, a plurality of capacitor sections each comprising alternating layers of conducting sheet material and dielectric sheet material wound together to form a roll, said sections disposed in said case with portions thereof abutting said insulating liner, said sections being electrically connected together and each section being individually surrounded by and insulated from a plurality of alternate layers of conducting material and insulating material.

6. A capacitor unit comprising a case, an insulating liner in said case, a plurality of capacitor sections each comprising alternating layers of conducting sheet material and dielectric sheet material wound together to form a roll, said sections disposed in said case with portions thereof abutting said insulating liner, said sections being electrically connected together and each section being individually surrounded by and insulated from a plurality of alternate layers of conducting foil and insulating material.

7. A capacitor unit comprising a rectangular case, an insulating liner in said case, a plurality of capacitor sections, each section comprising alternating layers of conducting foil and dielectric sheet material rolled together into a unitary, elongated, cylindrical structure having flat side faces and end faces, said sections disposed in said case with their side faces adjacent each other and their end faces abutting said insulating liner, said sections being electrically connected together and each section having a plurality of alternate layers of metal foil and insulating material wrapped therearound.

References Cited in the file of this patent

UNITED STATES PATENTS

| | | |
|---|---|---|
| 1,658,501 | Valle | Feb. 7, 1928 |
| 2,127,352 | Dubilier | Aug. 16, 1938 |
| 2,933,664 | Linderholm | Apr. 19, 1960 |